(12) United States Patent
Kiyokawa et al.

(10) Patent No.: US 11,639,275 B2
(45) Date of Patent: May 2, 2023

(54) PICKING FACILITY

(71) Applicant: Daifuku Co., Ltd., Osaka (JP)

(72) Inventors: Wataru Kiyokawa, Tokyo (JP); Atsushi Minoo, Tokyo (JP); Hiroyuki Kusube, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 17/173,641

(22) Filed: Feb. 11, 2021

(65) Prior Publication Data

US 2021/0245968 A1 Aug. 12, 2021

(30) Foreign Application Priority Data

Feb. 12, 2020 (JP) .............................. JP2020-021777

(51) Int. Cl.
| | | |
|---|---|---|
| *B65G 47/71* | (2006.01) | |
| *B65G 37/00* | (2006.01) | |
| *B65G 47/90* | (2006.01) | |
| *B65G 47/91* | (2006.01) | |

(52) U.S. Cl.
CPC ............. *B65G 47/71* (2013.01); *B65G 37/00* (2013.01); *B65G 47/901* (2013.01); *B65G 47/912* (2013.01)

(58) Field of Classification Search
CPC ........ B65G 47/71; B65G 47/52; B65G 47/90; B65G 47/901; B65G 47/902; B65G 47/904; B65G 47/905; B65G 47/907; B65G 47/908; B65G 47/91; B65G 47/911; B65G 47/912; B65G 47/914; B65G 47/915; B65G 47/917; B65G 47/918; B65G 47/92; B65B 21/18; B65B 21/12

See application file for complete search history.

(56) References Cited

U.S. PATENT DOCUMENTS

| | | | | |
|---|---|---|---|---|
| 3,783,587 | A * | 1/1974 | Kurtenbach | ............ B08B 1/006 53/247 |
| 5,456,563 | A * | 10/1995 | Halbo | .................... B65B 21/183 198/470.1 |
| 5,655,355 | A * | 8/1997 | Ramler | .................... B65B 5/105 53/244 |
| 6,325,591 | B1 * | 12/2001 | Focke | ................... B65G 47/901 414/749.6 |
| 7,644,558 | B1 * | 1/2010 | Fallas | ................... B65G 47/914 53/251 |
| 9,546,043 | B2 | 1/2017 | Diaconu | |

(Continued)

FOREIGN PATENT DOCUMENTS

| | | |
|---|---|---|
| JP | 20141078 A | 1/2014 |
| JP | 201540118 A | 3/2015 |

(Continued)

*Primary Examiner* — William R Harp
(74) *Attorney, Agent, or Firm* — The Webb Law Firm

(57) ABSTRACT

A picking facility includes a first conveyor for transporting a container that includes an opening portion provided on an upper side thereof and can contain an article, and a second conveyor for transporting a target article. The height level of a transport face of the first conveyor is set to be lower than the height level of a transport face of the second conveyor, and a difference between the height level of the transport face of the second conveyor and the height level of the transport face of the first conveyor is determined based on the height of the container.

8 Claims, 5 Drawing Sheets

(56) References Cited

U.S. PATENT DOCUMENTS

2002/0157919 A1    10/2002   Sherwin
2013/0209209 A1*   8/2013   Fukudome ............. B25J 9/0051
                                                                  901/27
2016/0236868 A1     8/2016   Diaconu

FOREIGN PATENT DOCUMENTS

| JP | 201730974 A | 2/2017 |
| JP | 2018145001 A | 9/2018 |
| WO | 2015045181 A1 | 4/2015 |

* cited by examiner

PICKING FACILITY

CROSS-REFERENCE TO RELATED APPLICATION

This application claims priority to Japanese Patent Application No. 2020-021777 filed Feb. 12, 2020, the disclosure of which is hereby incorporated by reference in its entirety.

BACKGROUND OF THE INVENTION

1. Field of the Invention

The present invention relates to a picking facility.

2. Description of the Related Art

A picking facility for picking requested articles is used in a physical distribution facility including an automated warehouse, for example. An example of such a picking facility is a picking facility disclosed in JP 2017-30974A (Patent Document 1) that includes a first conveyor for transporting open top containers capable of containing target articles, and a second conveyor for transporting the target articles individually. In the picking facility disclosed in Patent Document 1, an operator takes out necessary target articles from containers (original packaging cases Cm) transported on the first conveyor (picking conveyor 32) and transfers them to the second conveyor (picked article transport conveyor 36), at a picking position. Then, the target articles transported on the second conveyor are placed in shipment containers (article collection cases Cs) according to destinations and then shipped.

In the picking facility disclosed in Patent Document 1, the height level of the transport face of the first conveyor is set to be higher than the height level of the transport face of the second conveyor. However, with such a configuration, when the target article is taken out from the container and transferred onto the second conveyor, the travel stroke of the target article in the vertical direction is the sum of the upward travel distance that is necessary to move the target article over the side wall of the container and the downward travel distance from the position to which the target article has been moved upward to the transport face of the second conveyor. Since the height level of the transport face of the second conveyor is lower than the height level of the transport face of the first conveyor, the travel stroke is inevitably two or more times as large as the upward travel distance. That is, the travel stroke of each target article during the picking operation is large, and thus there is room for improvement from the viewpoint of operation efficiency.

SUMMARY OF THE INVENTION

It is therefore desired to realize a picking facility with excellent operation efficiency.

A picking facility according to the present disclosure is a picking facility including:

a first conveyor for transporting a container that includes an opening portion provided on an upper side thereof and can contain an article; and a second conveyor for transporting a target article, which is an article to be picked, wherein a height level of a transport face of the first conveyor is set to be lower than a height level of a transport face of the second conveyor, and a difference between the height level of the transport face of the second conveyor and the height level of the transport face of the first conveyor is determined based on a height of the container.

With this configuration, the transport face of the second conveyor can be arranged at an appropriate height in accordance with the height of the container located on the first conveyor. For example, the transport face of the second conveyor is arranged at a position near the upper end portion of the container located on the first conveyor. Accordingly, when the target article is taken out from the container and placed onto the second conveyor, the travel stroke of the target article in the vertical direction can be brought close to the upward travel distance that is necessary to move the target article over the side wall of the container. That is, the travel stroke of the target article in the vertical direction can be reduced. It should be noted that the same applies to a case where the target article transported on the second conveyor is placed in a container located on the first conveyor. Accordingly, a picking facility with excellent operation efficiency can be realized.

Further features and advantages of the technology according to the present disclosure will become apparent from the following description of illustrative and non-limiting embodiments with reference to the drawings.

DETAILED DESCRIPTION OF PREFERRED EMBODIMENTS

Figure 1:
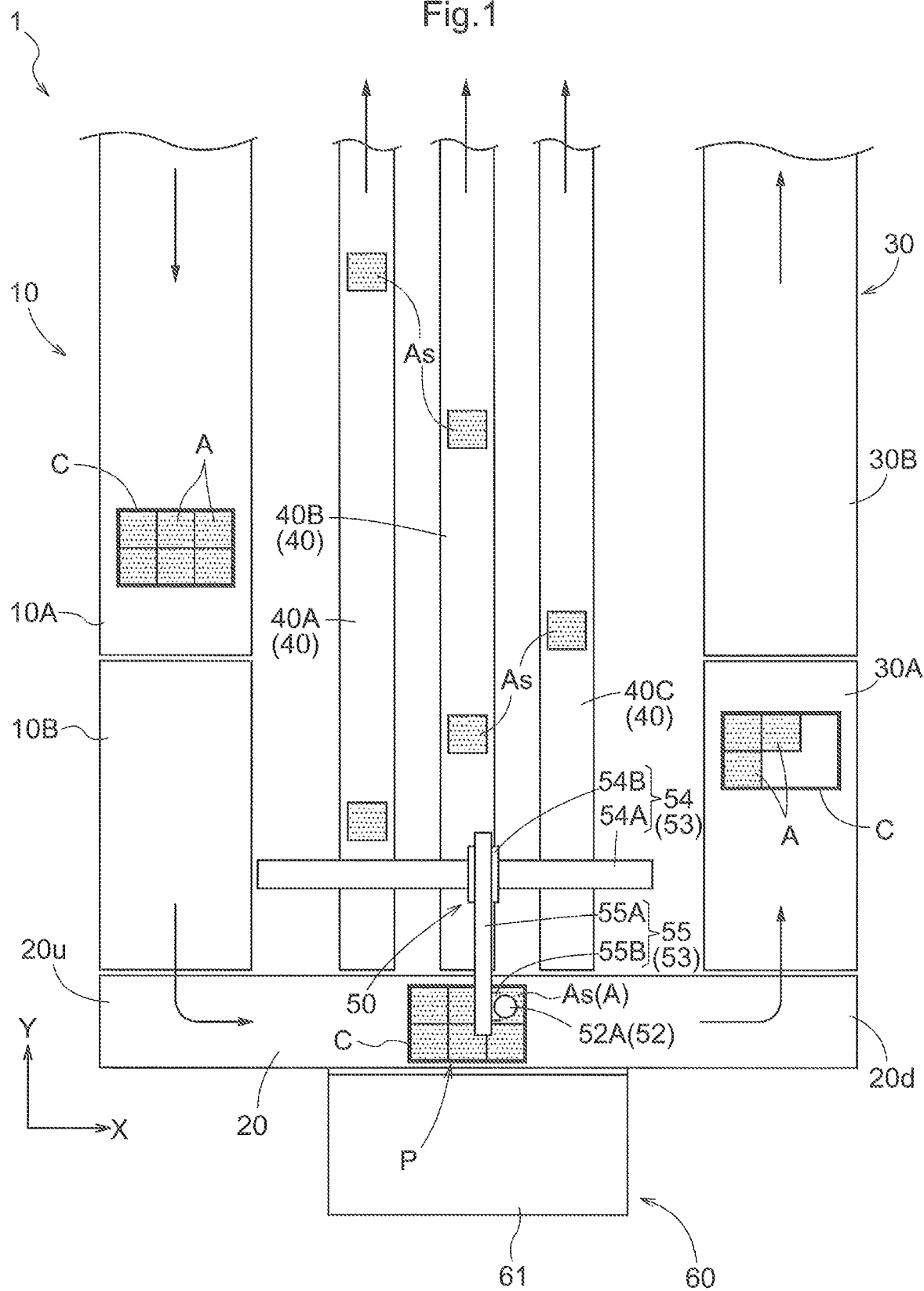
FIG. 1 is a plan view of a picking facility according to an embodiment.

An embodiment of the picking facility will be described with reference to the drawings. It should be noted that, in the description below, the horizontal direction in FIG. 1, which is a plan view of a picking facility, is taken as the "X direction", and the vertical direction in FIG. 1 is taken as the "Y direction". The vertical direction in FIG. 2, which is a side view of the picking facility, is taken as the "Z direction". In this embodiment, the Z direction corresponds to the actual vertical direction. The X direction, the Y direction, and the Z direction intersect one another (at right angles in this embodiment).

A picking facility 1 is a facility for picking requested articles in a physical distribution facility including an automated warehouse 90 (see FIG. 4), for example. The picking facility 1 of this embodiment is used to take out one or more target articles As from a plurality of articles A of the same type contained in a container C, perform this operation on a plurality of types of articles A (target articles As), and transfer a combination of the target articles As that have been taken out, to another container for article collection.

The container C is formed in a box shape including an opening portion Co provided on the upper side thereof. The container C is formed in a rectangular parallelepiped shape, and includes a side wall Cw that surrounds the periphery (four sides) thereof. The space delimited by the side wall Cw forms the inner space of the container C, and the articles A can be placed in this space. A plurality of types of containers C that each contain the articles A of the same type are stored in the automated warehouse 90. One or more of these containers C are supplied to the picking facility 1 of this embodiment. It should be noted that the container C from which necessary target articles As have been taken out in the picking facility 1 is returned to the automated warehouse 90 again.

As shown in FIG. 1, the picking facility 1 of this embodiment includes a retrieval conveyor 10, a picking conveyor 20, a storage conveyor 30, article collection conveyors 40, a picking apparatus 50, and a working space 60. The picking conveyor 20 is arranged extending in the X direction. The retrieval conveyor 10, the storage conveyor 30, and the article collection conveyors 40 are arranged on the same side with respect to the picking conveyor 20 (on the upper side in FIG. 1), and extend in parallel with one another in the Y direction. In this embodiment, the picking conveyor 20 corresponds to a "first conveyor", and the article collection conveyors 40 correspond to a "second conveyor".

Figure 2:
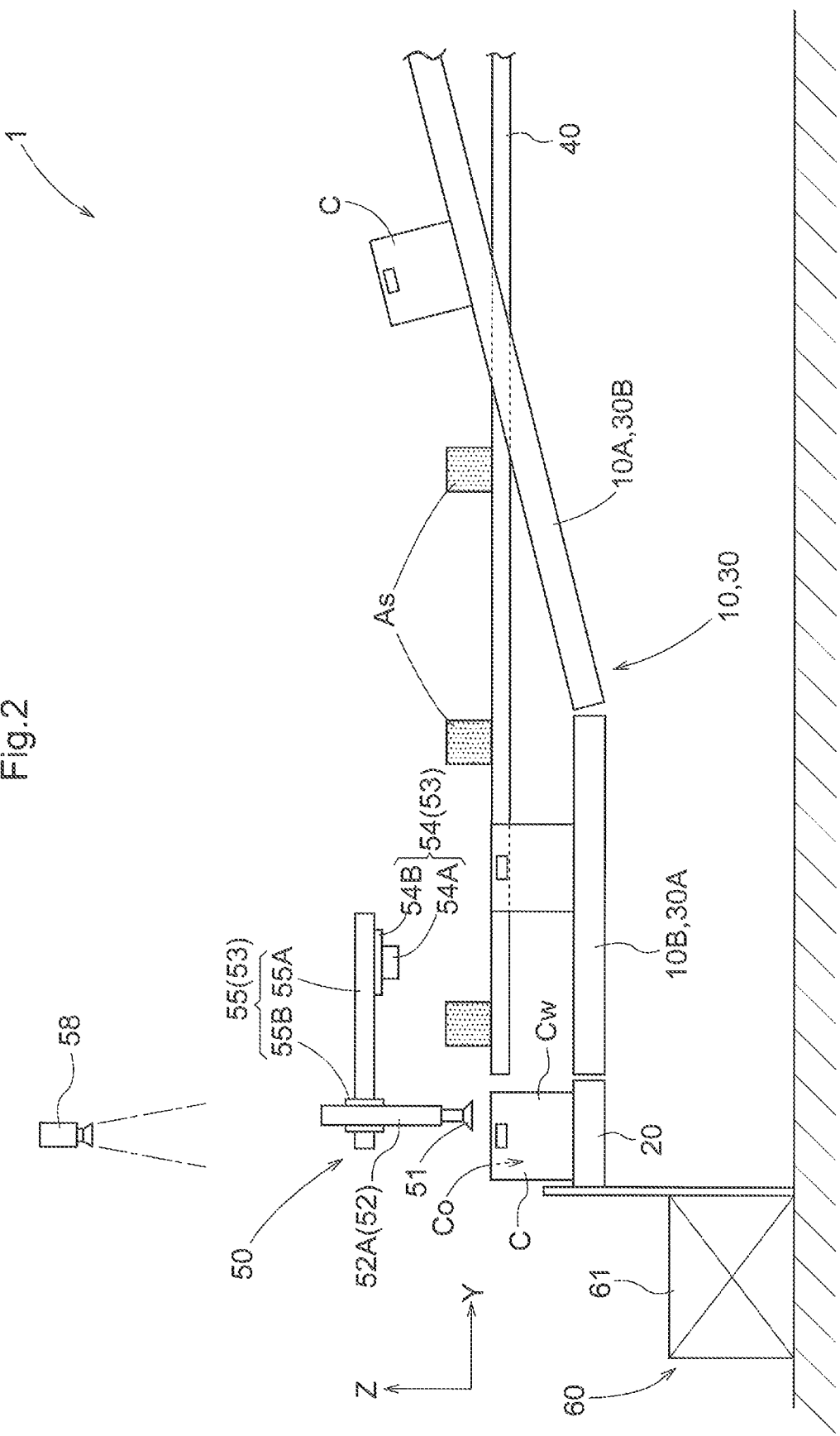
FIG. 2 is a side view of the picking facility.

The retrieval conveyor 10 transports the containers C containing the articles A that have been supplied from the automated warehouse 90. The retrieval conveyor 10 of this embodiment includes a first retrieval conveyor 10A and a second retrieval conveyor 10B that are connected to each other in series. In the retrieval conveyor 10, the upstream side of the first retrieval conveyor 10A is connected to the automated warehouse 90, and the downstream end portion of the second retrieval conveyor 10B is connected to an upstream end portion 20u of the picking conveyor 20. The retrieval conveyor 10 receives the containers C from the automated warehouse 90 and transports them in the Y direction to the picking conveyor 20. In this embodiment, as shown in FIG. 2, the second retrieval conveyor 10B extends in parallel with the XY plane, and the first retrieval conveyor 10A is inclined such that a portion on the upstream side (automated warehouse 90 side) is located at a higher position. Various known conveyors such as a roller conveyor, a belt conveyor, and a slat conveyor can be used as the retrieval conveyor 10.

The picking conveyor 20 transports the containers C containing the articles A that have been received from the retrieval conveyor 10. The picking conveyor 20 transports the containers C in the X direction. The central area in the X direction of the picking conveyor 20 serves as a picking position P, and articles requested as per picking orders are picked at this picking position P. These articles requested as per picking orders are articles A to be picked and are referred to as "target articles As" in this embodiment. A downstream end portion 20d of the picking conveyor 20 is connected to the upstream end portion of the storage conveyor 30. The picking conveyor 20 extends in parallel with the XY plane. Various known conveyors such as a roller conveyor, a belt conveyor, and a slat conveyor can be used as the picking conveyor 20.

The storage conveyor 30 transports the containers C containing the articles A (non-target articles) other than the target articles As or the empty containers C that have been received from the picking conveyor 20. The storage conveyor 30 of this embodiment includes a first storage conveyor 30A and a second storage conveyor 30B that are connected to each other in series. In the storage conveyor 30, the upstream end portion of the first storage conveyor 30A is connected to the downstream end portion 20d of the picking conveyor 20, and the downstream side of the second storage conveyor 30B is connected to the automated warehouse 90. The storage conveyor 30 receives, from the picking conveyor 20, the containers C that have been subjected to a picking operation, and transports them in the Y direction to the automated warehouse 90 side. In this embodiment, as shown in FIG. 2, the first storage conveyor 30A extends in parallel with the XY plane, and the second storage conveyor 30B is inclined such that a portion on the downstream side (automated warehouse 90 side) is located at a higher position. Various known conveyors such as a roller conveyor, a belt conveyor, and a slat conveyor can be used as the storage conveyor 30.

The retrieval conveyor 10, the picking conveyor 20, and the storage conveyor 30 are arranged in an angular U-shape as a whole in a plan view (i.e., as viewed in the Z direction).

The article collection conveyors 40 transport the target articles As that have been taken out from the containers C at the picking position P. In this embodiment, the article collection conveyors 40 transport the target articles As individually in a state in which the target articles As are placed directly on the article collection conveyors 40. The article collection conveyors 40 extend in the Y direction, and their end portions (upstream end portions) are adjacent to the picking conveyor 20. In this manner, the article collection conveyors 40 transport the individual target articles As in the direction away from the picking conveyor 20 (i.e., toward the upper side in FIG. 1). It is preferable that each of the article collection conveyors 40 is provided with a built-in lord cell for the purpose of confirming whether or not all of the requested target articles As have been taken out, and the like.

There is no particular limitation on the number of the article collection conveyors 40, and a plurality of article collection conveyors 40 are provided in this embodiment. Specifically, three article collection conveyors 40 that are independent of each other, namely a first article collection conveyor 40A, a second article collection conveyor 40B, and a third article collection conveyor 40C, are provided. These three article collection conveyors 40A to 40C extend in parallel and are adjacent to one another at regular intervals in the X direction. The retrieval conveyor 10 and the storage conveyor 30 are respectively arranged on the two sides in the X direction of the three article collection conveyors 40A to 40C with these article collection conveyors 40A to 40C being located therebetween. In other words, at least portions of the plurality of article collection conveyors 40 are arranged in the inner area of the angular U-shape formed by the retrieval conveyor 10, the picking conveyor 20, and the storage conveyor 30. Such an arrangement configuration makes it possible to use space efficiently and reduce the size of the picking facility 1.

Containers for article collection (article collection containers) are separately supplied to the downstream side of the article collection conveyors 40, and the target articles As are placed in the article collection containers according to destinations and then shipped. In the case where a plurality of article collection conveyors 40 are provided as in this embodiment, picking operations according to destinations corresponding to the number of article collection conveyors 40 can be performed simultaneously. Accordingly, the overall picking efficiency can be improved.

Figure 3:
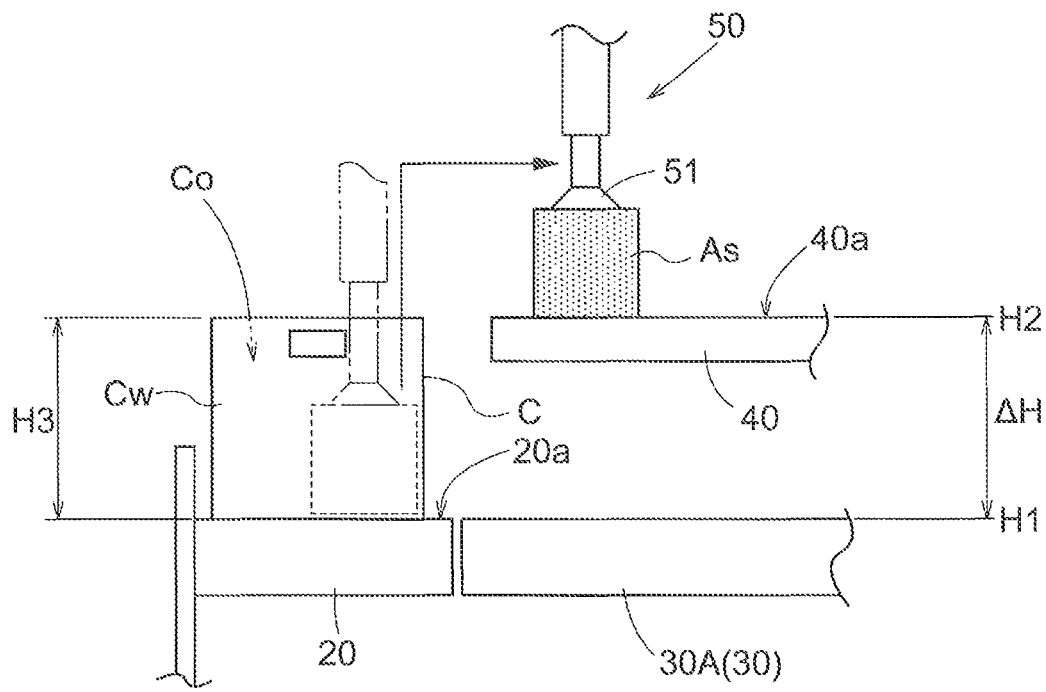
FIG. 3 is a diagram for explaining a positional relationship in the vertical direction between a picking conveyor and an article collection conveyor.

As shown in FIGS. 2 and 3, in the picking facility 1 of this embodiment, the article collection conveyors 40 are arranged at positions higher than that of the picking conveyor 20. Accordingly, a height level H1 of a transport face 20a of the picking conveyor 20 is lower than a height level H2 of the transport face 40a of each article collection conveyor 40. It should be noted that, when the picking conveyor 20 is a roller conveyor, the transport face 20a of the picking conveyor 20 is a virtual plane that is in contact with all of the rollers, and when the picking conveyor 20 is a belt conveyor or slat conveyor, the transport face 20a thereof is the surface of the belt or slat. The same applies to the transport face 40a of the article collection conveyor 40.

A difference ΔH (also referred to as a "conveyor level difference" hereinafter) between the height level H2 of the transport face 40a of the article collection conveyor 40 and the height level H1 of the transport face 20a of the picking conveyor 20 is determined based on a height H3 of the container C. That is, the conveyor level difference ΔH is set to a height determined based on the height H3 of the container C. The "height determined based on the height H3 of the container C" as used herein is determined based on the height H3 of the container C, and the concept thereof includes not only the height H3 of the container C itself but also a height that is larger or smaller by a predetermined amount than the height H3 of the container C. The "predetermined amount" in this case may be determined as appropriate in consideration of the structure of the picking facility 1, the installation environment and the controllability of the picking facility 1, the handleability of the container C and the target article As, and the like.

In this embodiment, as shown in FIG. 3, the difference ΔH between the height level H2 of the transport face 40a of the article collection conveyor 40 and the height level H1 of the transport face 20a of the picking conveyor 20 is set to match the height H3 of the container C. More specifically, the positions in the Z direction (vertical direction) of the picking conveyor 20 and the article collection conveyors 40 are determined such that the conveyor level difference ΔH is equal to the height H3 of the container C (ΔH=H2−H1=H3).

With this configuration, the height level (=H1+H3) of the upper end of a container C placed on the picking conveyor 20 is equal to the height level H2 of the transport face 40a of the article collection conveyor 40. Accordingly, when a target article As is taken out from the container C and placed on the article collection conveyor 40 during the picking operation, the travel stroke of the target article As in the Z direction (vertical direction) substantially includes only the upward travel distance (including a predetermined margin) that is necessary to move the target article As over the side wall Cw of the container C. That is, the individual target articles As taken out from the container C through the opening portion Co can be transferred onto the article collection conveyors 40 by merely moving them substantially horizontally (specifically, by moving them horizontally, and slightly vertically by an amount corresponding to the margin). Accordingly, it is possible to reduce the time required to pick the individual target articles As and to improve the overall picking efficiency.

The picking apparatus 50 picks the target article As from the articles A contained in the container C located at the picking position P, and transfers it to the article collection conveyor 40. As shown in FIGS. 1 and 2, the picking apparatus 50 of this embodiment includes a holding portion 51 that can hold the target article As, a raising/lowering mechanism 52 that moves the holding portion 51 in the Z direction (vertical direction), and a movement mechanism 53 that moves the holding portion 51 along the XY plane. The movement mechanism 53 includes a first movement mechanism 54 that moves the holding portion 51 in the X direction, and a second movement mechanism 55 that moves the holding portion 51 in the Y direction. That is, the picking apparatus 50 includes the holding portion 51, the raising/lowering mechanism 52, the first movement mechanism 54, and the second movement mechanism 55.

The holding portion 51 is configured so as to be capable of holding the target article As. In this embodiment, the holding portion 51 includes a suction nozzle, and can hold the target article As through vacuum suction and release the target article As through air supply. The raising/lowering mechanism 52 includes a raising/lowering main body portion 52A in which the holding portion 51 is fixed to the lower end portion. The raising/lowering main body portion 52A is supported by a second slider 55B of the second movement mechanism 55 in a state of being capable of sliding in the Z direction (vertical direction).

The first movement mechanism 54 includes a first guide rail 54A extending in the X direction, and a first slider 54B that is slidable along the first guide rail 54A. It should be noted that the first guide rail 54A is fixed to the installation surface or ceiling surface using a supporting member, suspending member, or the like, which are not shown in FIG. 2. A second guide rail 55A of the second movement mechanism 55 is fixed to the first slider 54B. The second movement mechanism 55 includes a second guide rail 55A extending in the Y direction, and a second slider 55B that is slidable along the second guide rail 55A. The raising/lowering mechanism 52 (raising/lowering main body portion 52A) is slidably supported by the second slider 55B.

By sliding the first slider 54B along the first guide rail 54A, the holding portion 51 is moved in the X direction via the second movement mechanism 55 and the raising/lowering mechanism 52. By sliding the second slider 55B along the second guide rail 55A, the holding portion 51 is moved in the Y direction via the raising/lowering mechanism 52. By sliding the raising/lowering main body portion 52A in the Z direction (vertical direction) relative to the second slider 55B, the holding portion 51 fixed to the lower end portion of the raising/lowering main body portion 52A is raised/lowered. In this manner, the picking apparatus 50 can move the holding portion 51 freely and three-dimensionally, and this function and the function of holding the target article As exhibited by the holding portion 51 can be utilized together to automatically transfer a target article As (automated picking).

It should be noted that the picking apparatus 50 is provided with a camera 58 as shown in FIG. 2. The camera 58 is installed facing downward at a position above the picking position P so as to be capable of taking, from above, pictures of the state inside the container C located at the picking position P.

The picking apparatus 50 is arranged at a position that overlaps the picking conveyor 20 and/or the article collection conveyors 40 in a plan view. It should be noted that a state in which two members "overlap each other in a plan view" means that at least a portion of one member and at least a portion of the other member overlap each other in a plan view. In this embodiment, as shown in FIGS. 1 and 2, the picking apparatus 50 is arranged at a position that is located above the picking conveyor 20 and the article collection conveyors 40 and overlaps the picking conveyor 20 and the article collection conveyors 40 in a plan view. More specifically, the picking apparatus 50 is arranged such that the first movement mechanism 54 overlaps the article collection conveyors 40 in a plan view and the second movement mechanism 55 overlaps at least the picking conveyor 20 in a plan view.

It should be noted that the second movement mechanism 55 is arranged overlapping the article collection conveyors 40 as well in a plan view depending on the position of the first slider 54B in the X direction. Furthermore, the raising/lowering mechanism 52 is arranged overlapping the picking conveyor 20 in a plan view depending on the position of the second slider 55B in the Y direction.

As described above, the picking apparatus 50 is arranged at a position that is located above the picking conveyor 20 and the article collection conveyors 40 and overlaps the picking conveyor 20 and the article collection conveyors 40 in a plan view, and therefore, a dedicated area for installation of the picking apparatus 50 is made unnecessary. By combining this configuration with the above-described configuration in which the retrieval conveyor 10, the picking conveyor 20, the storage conveyor 30, and the article collection conveyors 40 are compactly arranged, the overall size of the picking facility 1 is effectively reduced.

The working space 60 is a space in which an operator W performs a picking operation. Since the picking facility 1 of this embodiment includes the working space 60, manual picking by an operator W can be performed in addition to automated picking by the picking apparatus 50 (see FIG. 5). In this embodiment, a work platform 61 on which the operator W stands and performs operations is installed in the working space 60. It is preferable that the work platform 61 has a lifter function to enable height adjustment.

Figure 5:
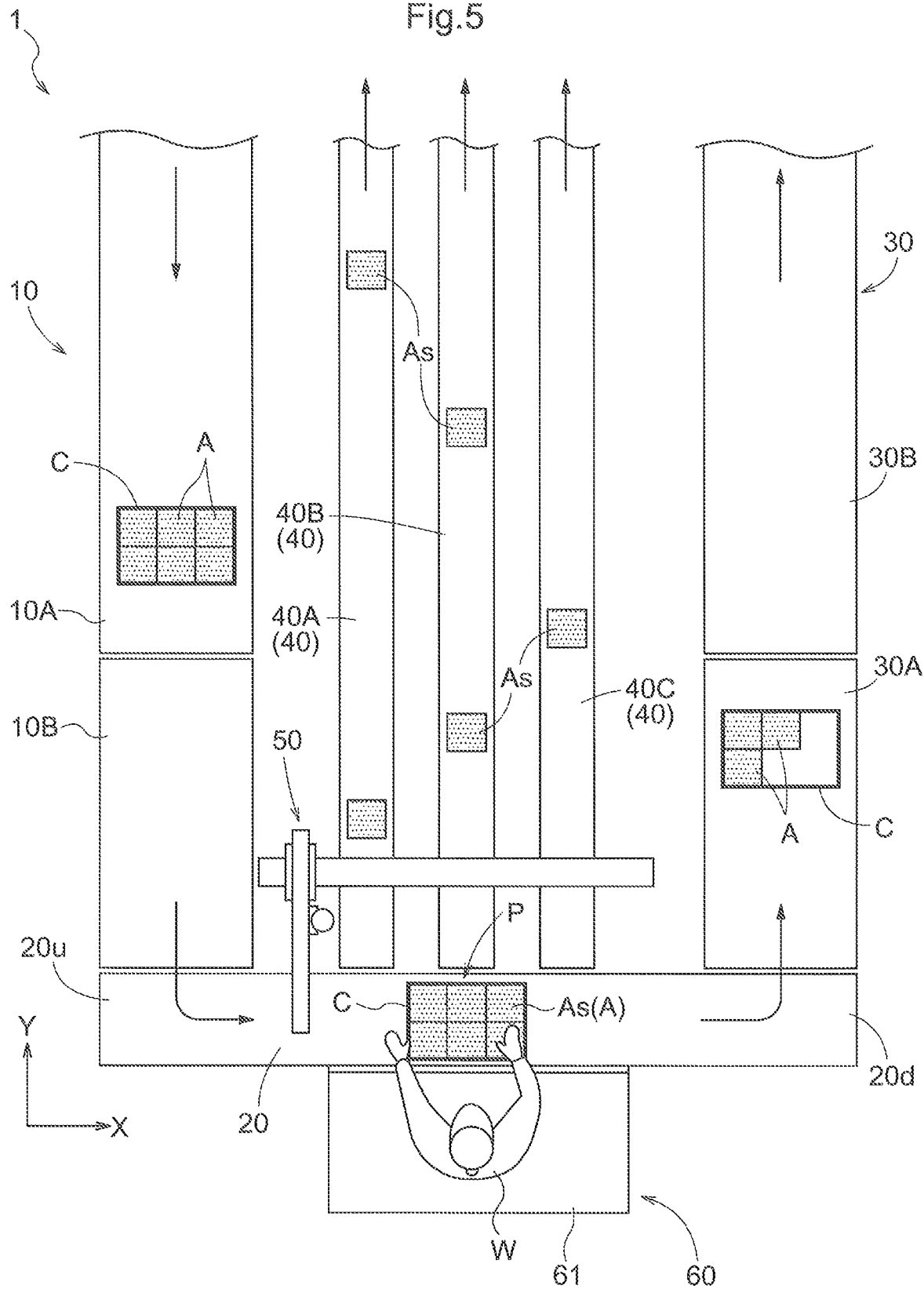
FIG. 5 is a plan view of the picking facility.

The working space 60 is arranged on a side opposite to the side on which the retrieval conveyor 10, the storage conveyor 30, and the article collection conveyors 40 are arranged with respect to the picking conveyor 20 (i.e., the lower side in FIG. 5). Also, the working space 60 is arranged on a side opposite to the side on which the picking apparatus 50 is arranged with respect to the picking conveyor 20. As described above, in this embodiment, the picking apparatus 50 and the working space 60 are respectively arranged on two sides of the picking conveyor 20 such that the picking conveyor 20 is located therebetween, and the picking apparatus 50 and the working space 60 do not overlap each other in a plan view. With such an arrangement configuration, even if the picking operation is switched from automated picking to manual picking while the picking apparatus 50 is stopped due to a failure thereof, for example, the picking apparatus 50 does not become an obstacle for the operator W performing an operation in the working space 60. Accordingly, the manual picking can be smoothly performed.

Figure 4:
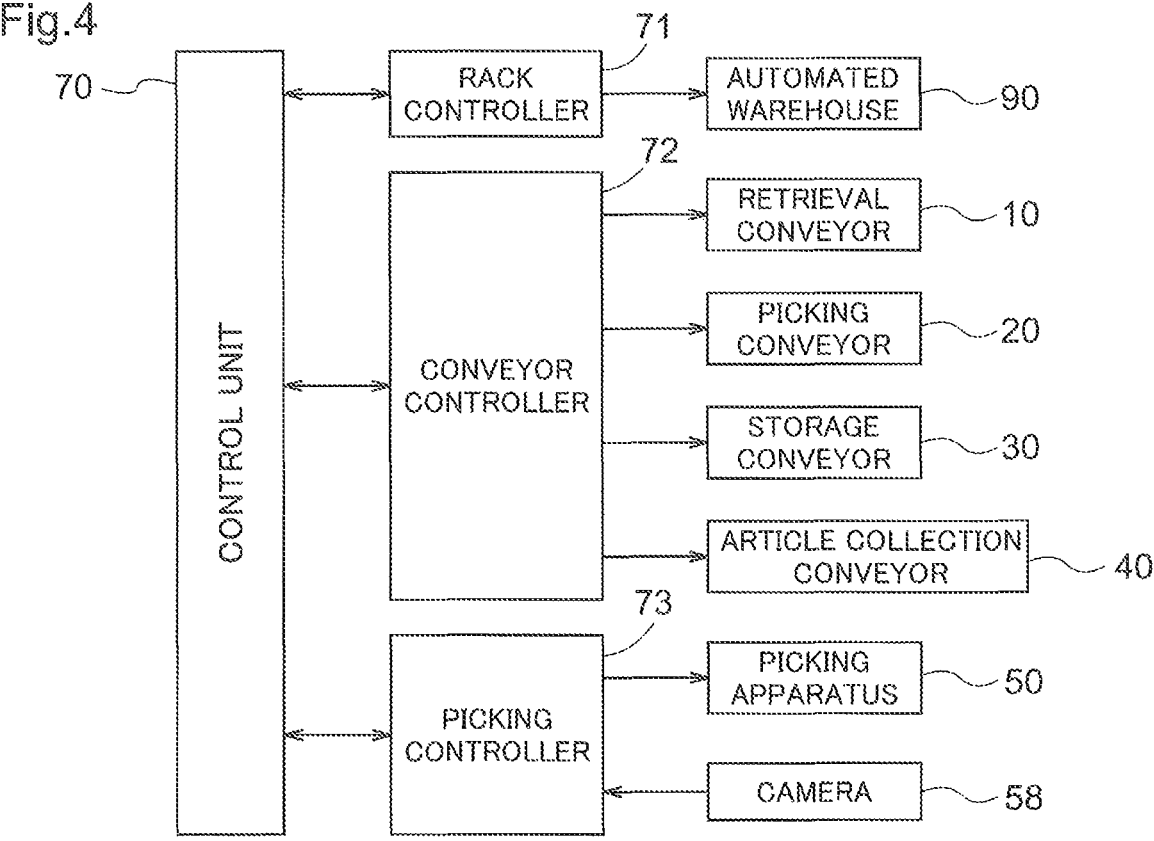
FIG. 4 is a block diagram of a control unit.

The picking facility 1 includes a control unit 70 for controlling the portions of the picking facility 1. The control unit 70 is constituted by a general-purpose computer such as a personal computer or a server computer including a central processing unit and a storage device such as a hard disk drive. As shown in FIG. 4, a rack controller 71, a conveyor controller 72, and a picking controller 73 are connected to the control unit 70 such that each controller can communicate with the control unit 70.

The rack controller 71 is configured to control the operations of the automated warehouse 90. In general, a guided vehicle including a transfer apparatus is provided in the automated warehouse 90. The rack controller 71 controls the travel operation of the guided vehicle and the transfer operation of the transfer apparatus and thus executes processing for retrieving the containers C from the automated warehouse 90 and the processing for storing the containers C in the automated warehouse 90.

The conveyor controller 72 is configured to control the operations of the retrieval conveyor 10, the picking conveyor 20, the storage conveyor 30, and the article collection conveyors 40. In general, each of the retrieval conveyor 10, the picking conveyor 20, the storage conveyor 30, and the article collection conveyors 40 includes a driving motor for transporting articles to be transported (containers C herein) in the transport direction. The conveyor controller 72 controls the rotational operations of these driving motors and thus executes processing for transporting the containers C that have been retrieved from the automated warehouse 90 and are then returned to the automated warehouse 90 again, and processing for transporting the target articles As taken out at the picking position P for subsequent shipping.

The picking controller 73 is configured to control the operations of the picking apparatus 50. As described above, the picking apparatus 50 includes the raising/lowering mechanism 52, the first movement mechanism 54, and the second movement mechanism 55. In general, the picking apparatus 50 further includes driving motors for sliding the raising/lowering main body portion 52A in the Z direction, the first slider 54B in the X direction, and the second slider 55B in the Y direction. The picking controller 73 controls the rotational operations of these driving motors and thus executes the processing for performing automated picking by the picking apparatus 50.

It should be noted that the picking controller 73 is configured to be capable of recognizing the positions, the orientations, and the like of the target articles As in the container C by processing images taken by the camera 58. The picking controller 73 controls the picking apparatus 50 based on the recognition results such that the automated picking by the picking apparatus 50 is appropriately performed.

Other Embodiments (1) In the embodiment above, the configuration in which the retrieval conveyor 10, the picking conveyor 20, and the storage conveyor 30 are arranged in an angular U-shape in a plan view is described as an example. However, there is no limitation to such a configuration, and the positional relationships of the retrieval conveyor 10 and the storage conveyor 30 to the picking conveyor 20 in a plan view can be changed as appropriate. For example, at least one of the retrieval conveyor 10 and the storage conveyor 30 may also be connected to the picking conveyor 20 at an obtuse angle or an acute angle. In this case, the retrieval conveyor 10 and the storage conveyor 30 may also intersect each other in a plan view.

(2) In the embodiment above, the configuration in which the retrieval conveyor 10 and the storage conveyor 30 are arranged on the same side as the side on which the article collection conveyors 40 are arranged with respect to the picking conveyor 20 is described as an example. However, there is no limitation to such a configuration, and the retrieval conveyor 10 and the storage conveyor 30 may also be arranged on a side opposite to the side on which the article collection conveyors 40 are arranged with respect to the picking conveyor 20. In this case, the retrieval conveyor 10 and the storage conveyor 30 may also be arranged such that the working space 60 is located therebetween in the X direction (first transport direction). Alternatively, the retrieval conveyor 10 and the storage conveyor 30 may also be lined up in a row with the picking conveyor 20.

(3) In the embodiment above, the configuration in which only one picking conveyor 20 is provided is described as an example. However, there is no limitation to such a configuration, and a plurality of picking conveyors 20 that are independent of each other may also be provided and arranged in parallel at regular intervals in the Y direction.

(4) In the embodiment above, the configuration in which the three article collection conveyors 40, which are independent of each other, are provided is described as an example. However, there is no limitation to such a configuration, and the number of the article collection conveyors 40 may also be two or four or more, for example. Alternatively, a configuration in which only one article collection conveyor 40 is provided may also be employed.

(5) In the embodiment above, the configuration in which the three article collection conveyors 40 are arranged in parallel with one another is described as an example. However, there is no limitation to such a configuration, and a plurality of article collection conveyors 40 may also be arranged such that the extension directions thereof radially extend or intersect in a plan view.

(6) In the embodiment above, the configuration in which the holding portion 51 of the picking apparatus 50 includes the suction nozzle and can hold the target article As through vacuum suction is described as an example. However, there is no limitation to such a configuration, and the holding portion 51 may also include a robot hand, holding claw, or the like that can hold the target article As.

(7) In the embodiment above, the configuration in which the picking apparatus 50 includes the holding portion 51, the raising/lowering mechanism 52 that moves the holding portion 51 in the Z direction, the first movement mechanism 54 that moves the holding portion 51 in the X direction, and the second movement mechanism 55 that moves the holding portion 51 in the Y direction is described as an example. However, there is no limitation to such a configuration, and the picking apparatus 50 may also be constituted by an articulated robot arm or the like, for example.

Figure 6:
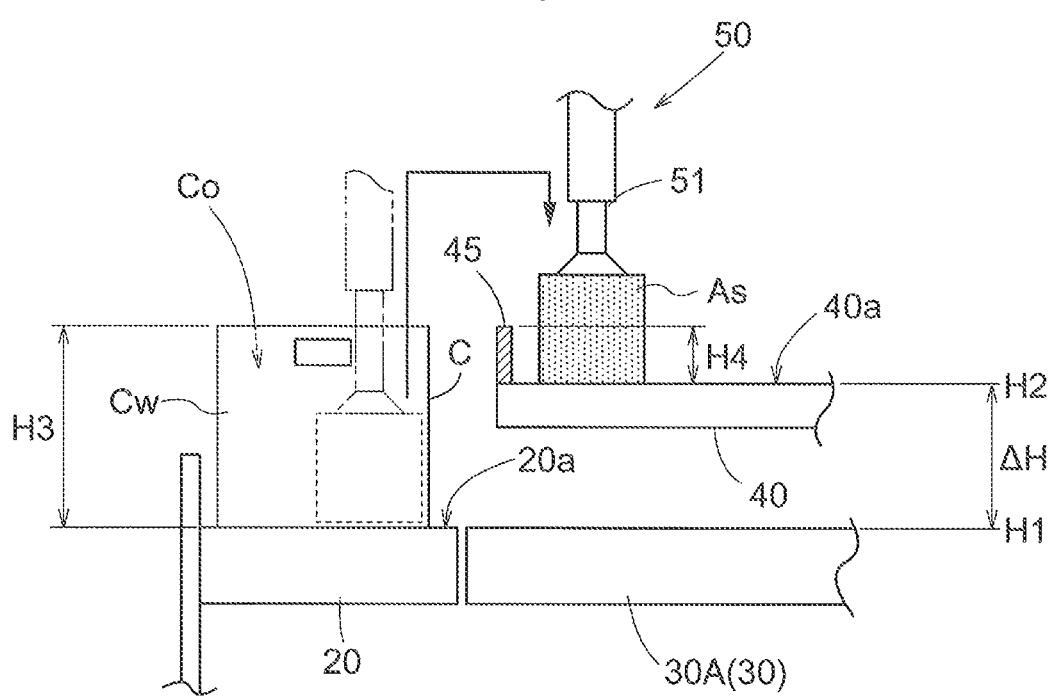
FIG. 6 is another diagram for explaining a relationship in the vertical direction between the picking conveyor and the article collection conveyor.

(8) In the embodiment above, each article collection conveyor 40 may include a stopper 45 provided at the end portion near the picking conveyor 20 as shown in FIG. 6, for example. The stopper 45 protrudes upward from the transport face 40a of the article collection conveyor 40. For example, even in a case where the target articles As have an external shape such as a spherical shape and thus are likely to roll, such a stopper 45 can prevent the target articles As transferred onto the article collection conveyor 40 from falling toward the picking conveyor 20 side. In the case of such a configuration, it is preferable to determine the positional relationship between the picking conveyor 20 and the article collection conveyor 40 in consideration of a height H4 of the stopper 45 in addition to the height H3 of the container C. In the example shown in FIG. 6, the difference ΔH between the height level H2 of the transport face 40a of the article collection conveyor 40 and the height level H1 of the transport face 20a of the picking conveyor 20 is set to match a value obtained by subtracting the height H4 of the stopper 45 from the height H3 of the container C. More specifically, the positions in the Z direction (vertical direction) of the picking conveyor 20 and the article collection conveyors 40 are determined such that the conveyor level difference ΔH is equal to the difference between the height 113 of the container C and the height 114 of the stopper 45 (ΔH=H2−H1=H3−H4).

(9) In the embodiment above, the configuration in which the picking apparatus 50 is arranged at the position that overlaps the picking conveyor 20 and the article collection conveyors 40 and does not overlap the working space 60 in a plan view is described as an example. However, there is no limitation to such a configuration, and a configuration may also be employed in which the picking apparatus 50 is arranged on a side opposite to where the article collection conveyors 40 and the like are arranged with the picking conveyor 20 being located between the picking apparatus 50 and the article collection conveyors 40, and does not overlap the article collection conveyors 40 in a plan view. Moreover, the picking apparatus 50 may be arranged overlapping the working space 60 in a plan view.

(10) In the embodiment above, the picking facility 1 that is configured such that the automated picking by the picking apparatus 50 is performed in normal cases and the manual picking by the operator W is performed only while the picking apparatus 50 is stopped due to a failure thereof or the like is mainly considered and described. However, there is no limitation to such a configuration, and the picking facility 1 may also be configured to be capable of actively switching between an automatic mode in which automated picking is performed and a manual mode in which manual picking is performed.

(11) In the embodiment above, the configuration in which the picking facility 1 includes the picking apparatus 50 is described as an example. However, there is no limitation to such a configuration, and a configuration may also be employed in which the picking facility 1 does not include the picking apparatus 50, and manual picking is performed principally.

(12) In the embodiment above, the configuration in which the picking facility 1 includes the working space 60 is described as an example. However, there is no limitation to such a configuration, and a configuration may also be employed in which the picking facility 1 does not include the working space 60, and automated picking is performed principally.

(13) The configurations disclosed in the above-described embodiments (including the above-mentioned embodiment and other embodiments; the same applies hereinafter) can also be used in combination with configurations disclosed in other embodiments as long as they are compatible with each other. Regarding the other configurations, the embodiments disclosed herein are illustrative in all respects and can be modified as appropriate without departing from the gist of the present disclosure.

Outline of the Embodiment

To summarize the description above, the picking facility according to the present disclosure preferably includes the following configurations.

The picking facility according to the present disclosure is a picking facility including:

a first conveyor for transporting a container that includes an opening portion provided on an upper side thereof and can contain an article; and a second conveyor for transporting a target article, which is an article to be picked, wherein a height level of a transport face of the first conveyor is set to be lower than a height level of a transport face of the second conveyor, and a difference between the height level of the transport face of the second conveyor and the height level of the transport face of the first conveyor is determined based on a height of the container.

With this configuration, the transport face of the second conveyor can be arranged at an appropriate height in accordance with the height of the container located on the first conveyor. For example, the transport face of the second conveyor is arranged at a position near the upper end portion of the container located on the first conveyor. Accordingly, when the target article is taken out from the container and placed onto the second conveyor, the travel stroke of the target article in the vertical direction can be brought close to the upward travel distance that is necessary to move the target article over the side wall of the container. That is, the travel stroke of the target article in the vertical direction can be reduced. It should be noted that the same applies to a case where the target article transported on the second conveyor is placed in the container located on the first conveyor. Accordingly, a picking facility with excellent operation efficiency can be realized.

In an aspect, it is preferable that the difference between the height level of the transport face of the second conveyor and the height level of the transport face of the first conveyor is set to match the height of the container.

With this configuration, when the target article is taken out from the container and placed onto the second conveyor, the travel stroke of the target article in the vertical direction can be minimized. As a result, it is possible to transfer, onto the second conveyor, the individual target articles taken out from the container by merely moving them horizontally, and slightly vertically. Accordingly, the operation efficiency can be further improved.

In an aspect, it is preferable that the second conveyor is arranged extending in a direction intersecting a transport direction of the first conveyor in a state in which an end portion is adjacent to the first conveyor, and includes a stopper that is provided at an end portion near the first conveyor and protrudes upward from the transport face of the second conveyor, and the difference between the height level of the transport face of the second conveyor and the height level of the transport face of the first conveyor is set to match a value obtained by subtracting a height of the stopper from the height of the container.

With this configuration, the second conveyor includes the stopper, and therefore, it is possible to prevent the target articles transferred onto the second conveyor from falling toward the first conveyor side. Moreover, with the configuration in which the second conveyor includes such a stopper, when the target article is taken out from the container and placed onto the second conveyor, the travel stroke of the target article in the vertical direction can be minimized. Accordingly, from these two viewpoints, the operation efficiency can be further improved.

In an aspect, it is preferable that the picking facility further includes a picking apparatus that takes out the target article from the container, and the picking apparatus includes a holding portion that can hold the target article, a movement mechanism that moves the holding portion in directions extending along the transport face of the first conveyor, and a raising/lowering mechanism that moves the holding portion in a vertical direction.

With this configuration, the target article can be moved freely and three-dimensionally in the state of being held by the holding portion, and automated picking by the picking apparatus can be appropriately performed. In such automated picking, when the picking apparatus transfers the target article, the magnitude of the travel stroke of the holding portion directly affects the operation efficiency. In this regard, with the technology disclosed in the present disclosure, the travel stroke of the holding portion in the vertical direction can be reduced, and the automated picking itself leads to greater efficiency, thus making it possible to significantly improve the operation efficiency.

It is sufficient that the picking facility according to the present disclosure can exhibit at least one of the above-described effects.

What is claimed is:

1. A picking facility comprising:
    a first conveyor for transporting a container that includes an opening portion provided on an upper side thereof and containing at least one article therein; and
    a second conveyor for transporting a target article, which is an article to be picked from the container,
    wherein a height level of a transport face of the first conveyor is set to be lower than a height level of a transport face of the second conveyor, and
    wherein a difference between the height level of the transport face of the second conveyor and the height level of the transport face of the first conveyor is determined based on a height smaller by a predetermined amount than the height of the container.

2. The picking facility according to claim 1,
    wherein the difference between the height level of the transport face of the second conveyor and the height level of the transport face of the first conveyor is set to match the height of the container.

3. The picking facility according to claim 2, further comprising:
    a picking apparatus that takes out the target article from the container, and
    wherein the picking apparatus includes a holding portion that can hold the target article, a movement mechanism that moves the holding portion in directions extending along the transport face of the first conveyor, and a raising/lowering mechanism that moves the holding portion in a vertical direction.

4. The picking facility according to claim 1,
    wherein the second conveyor is arranged extending in a direction intersecting a transport direction of the first conveyor in a state in which an end portion is adjacent to the first conveyor, and includes a stopper that is provided at an end portion near the first conveyor and protrudes upward from the transport face of the second conveyor, and
    wherein the difference between the height level of the transport face of the second conveyor and the height level of the transport face of the first conveyor is set to match a value obtained by subtracting a height of the stopper from the height of the container.

5. The picking facility according to claim 4, further comprising:
    a picking apparatus that takes out the target article from the container, and
    wherein the picking apparatus includes a holding portion that can hold the target article, a movement mechanism that moves the holding portion in directions extending along the transport face of the first conveyor, and a raising/lowering mechanism that moves the holding portion in a vertical direction.

6. The picking facility according to claim 1, further comprising:
    a picking apparatus that takes out the target article from the container, and
    wherein the picking apparatus includes a holding portion that can hold the target article, a movement mechanism that moves the holding portion in directions extending along the transport face of the first conveyor, and a raising/lowering mechanism that moves the holding portion in a vertical direction.

7. A picking facility comprising:

a first conveyor for transporting a container that includes an opening portion provided on an upper side thereof and containing at least one article therein; and a second conveyor for transporting a target article, which is an article to be picked from the container, wherein a height level of a transport face of the first conveyor is set to be lower than a height level of a transport face of the second conveyor, and wherein a difference between the height level of the transport face of the second conveyor and the height level of the transport face of the first conveyor is equals a height of the container.

8. A picking facility comprising:

a first conveyor for transporting a container that includes an opening portion provided on an upper side thereof and containing at least one article therein; and a second conveyor for transporting a target article, which is an article to be picked from the container, wherein a height level of a transport face of the first conveyor is set to be lower than a height level of a transport face of the second conveyor, wherein a difference between the height level of the transport face of the second conveyor and the height level of the transport face of the first conveyor is determined based on a height of the container, wherein the second conveyor includes a stopper that protrudes upward from the transport face of the second conveyor, and wherein the difference between the height level of the transport face of the second conveyor and the height level of the transport face of the first conveyor is set to match a value obtained by subtracting a height of the stopper from the height of the container.

* * * * *